(12) United States Patent
Gilbert-Eyres et al.

(10) Patent No.: US 12,479,457 B2
(45) Date of Patent: Nov. 25, 2025

(54) INDIVIDUALIZED VEHICLE POWER CONSUMPTION PROFILE GENERATION

(71) Applicant: GM Global Technology Operations LLC, Detroit, MI (US)

(72) Inventors: Matthew Edward Gilbert-Eyres, Rochester Hills, MI (US); Adam Lee Wright, Livonia, MI (US); Russell A. Patenaude, Macomb Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 154 days.

(21) Appl. No.: 18/519,403

(22) Filed: Nov. 27, 2023

(65) Prior Publication Data

US 2025/0171042 A1    May 29, 2025

(51) Int. Cl.
*B60W 50/14* (2020.01)
*B60K 35/28* (2024.01)
*B60W 50/00* (2006.01)

(52) U.S. Cl.
CPC ............. *B60W 50/14* (2013.01); *B60K 35/28* (2024.01); *B60K 2360/164* (2024.01); *B60K 2360/195* (2024.01); *B60K 2360/349* (2024.01); *B60W 2050/0083* (2013.01); *B60W 2050/146* (2013.01); *B60W 2510/244* (2013.01); *B60W 2540/215* (2020.02)

(58) Field of Classification Search
CPC ........... B60W 50/14; B60W 2540/215; B60W 2050/0083; B60W 2050/146; B60W 2510/244; B60K 35/28; B60K 2360/195; B60K 2360/164; B60K 2360/349
See application file for complete search history.

(56) References Cited

U.S. PATENT DOCUMENTS

| | | | |
|---|---|---|---|
| 8,332,096 B2 * | 12/2012 | Riegelman | B60W 20/12 701/34.4 |
| 9,482,544 B1 * | 11/2016 | Konet | G01C 21/3469 |
| 11,781,515 B1 | 10/2023 | Weston et al. | |
| 12,333,457 B1 * | 6/2025 | Monyei | G06Q 30/0202 |

(Continued)

FOREIGN PATENT DOCUMENTS

| | | | | |
|---|---|---|---|---|
| CN | 108583478 A | * | 9/2018 | ........... B60R 16/033 |
| CN | 110264720 B | * | 1/2023 | ....... G08G 1/096725 |

(Continued)

*Primary Examiner* — Chico A Foxx
(74) *Attorney, Agent, or Firm* — CANTOR COLBURN LLP (57) ABSTRACT

A method for implementing custom power consumption profiles for electric vehicles comprising identifying a set of data elements corresponding to a specific upcoming trip using a controller, identifying whether an existing custom power consumption profile matching the set of data elements is available to the controller and responding to a lack of existing custom power consumption profiles by entering a create custom power consumption profile routine, responding to identification of an existing custom power consumption profile by providing a vehicle operator with at least one suggested modification to the existing custom power consumption profile, and enacting the identified custom power consumption profile including all accepted suggested modifications of the at least one suggested modification.

20 Claims, 4 Drawing Sheets

(56) References Cited

U.S. PATENT DOCUMENTS

| | | | | |
|---|---|---|---|---|
| 2003/0006914 | A1* | 1/2003 | Todoriki | B60L 53/64 |
| | | | | 701/423 |
| 2011/0060495 | A1* | 3/2011 | Kono | G01C 21/3469 |
| | | | | 701/31.4 |
| 2011/0166731 | A1* | 7/2011 | Kristinsson | B60W 10/08 |
| | | | | 180/65.265 |
| 2014/0184401 | A1* | 7/2014 | Richter | B60L 3/12 |
| | | | | 340/439 |
| 2014/0214301 | A1* | 7/2014 | Edgren | B60K 35/00 |
| | | | | 701/99 |
| 2014/0215410 | A1* | 7/2014 | Fleizach | G06F 3/04883 |
| | | | | 715/863 |
| 2017/0177059 | A1* | 6/2017 | Fan | G06F 1/3287 |
| 2018/0189717 | A1* | 7/2018 | Cao | G06Q 50/40 |
| 2019/0096251 | A1* | 3/2019 | O'Sullivan | G06Q 10/00 |
| 2022/0115897 | A1* | 4/2022 | Ijaz | H01M 10/441 |
| 2022/0126863 | A1* | 4/2022 | Moustafa | H04W 4/46 |
| 2022/0342514 | A1* | 10/2022 | Chao | G06F 3/0362 |
| 2023/0093349 | A1* | 3/2023 | Powell | G01R 31/367 |
| | | | | 701/22 |
| 2023/0146288 | A1* | 5/2023 | Hershkovitz | B60L 58/14 |
| | | | | 701/22 |
| 2023/0313748 | A1 | 10/2023 | Salter et al. | |
| 2024/0102815 | A1* | 3/2024 | Sujan | G01C 21/3469 |
| 2024/0257575 | A1* | 8/2024 | Liu | B60L 50/61 |
| 2024/0280368 | A1* | 8/2024 | Quint | G01C 21/3691 |
| 2024/0326646 | A1* | 10/2024 | Lu | G06Q 50/40 |
| 2025/0018866 | A1* | 1/2025 | Koetje | B60R 1/008 |

FOREIGN PATENT DOCUMENTS

| | | | | |
|---|---|---|---|---|
| CN | 115675438 | A * | 2/2023 | B60W 20/12 |
| EP | 4275940 | A1 * | 11/2023 | B60K 35/29 |

* cited by examiner

INDIVIDUALIZED VEHICLE POWER CONSUMPTION PROFILE GENERATION

INTRODUCTION

The subject disclosure relates to power consumption management for vehicles, and more specifically to a method and system for generating individualized power consumption profiles.

Electric vehicles (EVs) and hybrid electric vehicles utilize stored electric energy to power motors and vehicle systems. As a result, the amount of charge stored in vehicle energy storage systems (e.g. batteries) directly impacts the range of the vehicle with a greater energy storage resulting in an increased range. In order to optimize range and other vehicle systems, EVs and hybrid EVs utilize power consumption profiles that dictate what non-mandatory vehicle systems should receive power and how much power, at any given point in operation.

A common psychological barrier that some individuals face when considering adopting or using an electric or hybrid electric vehicle is a fear that the range of the vehicle will be insufficient due to other vehicle systems expending energy. This fear is referred to generally as "range anxiety". To help overcome the range anxiety, vehicles include configurable power consumption profiles that either allow a user to select from one of a small number of pre-programmed profiles or allow a user to make minor changes to a single power consumption profile. The power consumption profiles define how and when other vehicle systems (e.g., non-motor systems) expend energy during a trip. These options may not offer sufficient flexibility, or account for variations between specific vehicles and fleets or specific preferences of a given customer.

Accordingly, it is desirable to provide a system that allows for power consumption profiles specific to a vehicle, or fleet of vehicles, to be utilized.

SUMMARY

In one exemplary embodiment a method for implementing custom power consumption profiles for electric vehicles includes identifying a set of data elements corresponding to a specific upcoming trip using a controller, identifying whether an existing custom power consumption profile matching the set of data elements is available to the controller and responding to a lack of existing custom power consumption profiles by entering a create custom power consumption profile routine, responding to identification of an existing custom power consumption profile by providing a vehicle operator with at least one suggested modification to the existing custom power consumption profile, and enacting the identified custom power consumption profile including all accepted suggested modifications of the at least one suggested modification.

In addition to one or more of the features described herein each suggested modification in the at least one suggested modification is displayed to a vehicle operator using an infotainment screen.

In addition to one or more of the features described herein each suggested modification includes an expected range increase corresponding to acceptance of the suggested modification.

In addition to one or more of the features described herein, the method includes a prompt requesting a vehicle operator to confirm acceptance of the at least one suggested modification and a prompt requesting the vehicle operator to confirm implementation of the modified power consumption profile after the vehicle operator has responded to all of the at least one suggested modifications.

In addition to one or more of the features described herein the method includes prompting the vehicle operator with an option to enable an intelligent infotainment system and enabling the intelligent infotainment system in response to the vehicle operator accepting the prompt.

In addition to one or more of the features described herein the intelligent infotainment system includes one of disabling a display and dimming the display and one of enabling the display and brightening the display in response to a triggering event.

In addition to one or more of the features described herein the create custom power consumption profile routine includes retrieving the set of data elements, providing a list of features to the vehicle operator and receiving a set of features to disable from the vehicle operator, prompting the vehicle operator to confirm disabling the features in the set of features to disable, and saving the set of features to disable as a feature adjustment and outputting the feature adjustment as a new power consumption profile.

In addition to one or more of the features described herein the method further includes saving the power consumption profile to a memory.

In another exemplary embodiment a vehicle includes an energy storage system and a controller, the controller including a memory storing instructions for causing the controller to perform the method of identifying a set of data elements corresponding to a specific upcoming trip using a controller, identifying whether an existing custom power consumption profile matching the set of data elements is available to the controller and responding to a lack of existing custom power consumption profiles by entering a create custom power consumption profile routine, responding to identification of an existing custom power consumption profile by providing a vehicle operator with at least one suggested modification to the existing custom power consumption profile, and enacting the identified custom power consumption profile including all accepted suggested modifications of the at least one suggested modification.

In addition to one or more of the features described herein each suggested modification in the at least one suggested modification is displayed to a vehicle operator using an infotainment screen.

In addition to one or more of the features described herein each suggested modification includes an expected range increase corresponding to acceptance of the suggested modification.

In addition to one or more of the features described herein, the method includes a prompt requesting a vehicle operator to confirm acceptance of the at least one suggested modification and a prompt requesting the vehicle operator to confirm implementation of the modified power consumption profile after the vehicle operator has responded to all of the at least one suggested modifications.

In addition to one or more of the features described herein, the method includes prompting the vehicle operator with an option to enable an intelligent infotainment system and enabling the intelligent infotainment system in response to the vehicle operator accepting the prompt.

In addition to one or more of the features described herein the intelligent infotainment system includes one of disabling a display and dimming the display and one of enabling the display and brightening the display in response to a triggering event.

In addition to one or more of the features described herein the create custom power consumption profile routine includes retrieving the set of data elements, providing a list of features to the vehicle operator and receiving a set of features to disable from the vehicle operator, prompting the vehicle operator to confirm disabling the features in the set of features to disable, and saving the set of features to disable as a feature adjustment and outputting the feature adjustment as a new power consumption profile.

In addition to one or more of the features described herein the method includes saving the power consumption profile to a memory.

In yet another exemplary embodiment a vehicle controller includes a processer and a memory, the memory storing instructions for causing the vehicle controller to perform the method of identifying a set of data elements corresponding to a specific upcoming trip using a controller, identifying whether an existing custom power consumption profile matching the set of data elements is available to the controller and responding to a lack of existing custom power consumption profiles by entering a create custom power consumption profile routine, responding to identification of an existing custom power consumption profile by providing a vehicle operator with at least one suggested modification to the existing custom power consumption profile, and enacting the identified custom power consumption profile including all accepted suggested modifications of the at least one suggested modification.

In addition to one or more of the features described herein the method further includes a prompt requesting a vehicle operator to confirm acceptance of the at least one suggested modification and a prompt requesting the vehicle operator to confirm implementation of the modified power consumption profile after the vehicle operator has responded to all of the at least one suggested modifications.

In addition to one or more of the features described herein the method further includes prompting the vehicle operator with an option to enable an intelligent infotainment system and enabling the intelligent infotainment system in response to the vehicle operator accepting the prompt.

In addition to one or more of the features described herein the create custom power consumption profile routine includes retrieving the set of data elements, providing a list of features to the vehicle operator and receiving a set of features to disable from the vehicle operator, prompting the vehicle operator to confirm disabling the features in the set of features to disable, and saving the set of features to disable as a feature adjustment and outputting the feature adjustment as a new power consumption profile.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. As used herein the term controller refers to any computerized control system including dedicated control systems, general vehicle controllers, control programs distributed across multiple systems, or any similar control architecture.

In accordance with an exemplary embodiment, a vehicle controller, or a fleet controller, includes a method allowing an operator to identify and implement a specific power consumption profile, thereby allowing power consumption to be tailored to the particularity of a specific vehicle or fleet of vehicles.

With continued reference to the general system described above, FIG. 1 shows an embodiment of a motor vehicle 10 including a battery system controller 24 configured to control a battery system. The vehicle 10 includes a vehicle body 12 defining, at least in part, an occupant compartment 14. The vehicle body 12 also supports various vehicle subsystems including a propulsion system 16, a battery system 22, and other subsystems to support functions of the propulsion system 16 and other vehicle components, such as a braking subsystem, a suspension system, a steering subsystem, a fuel injection subsystem, an exhaust subsystem and others.

Figure 1:
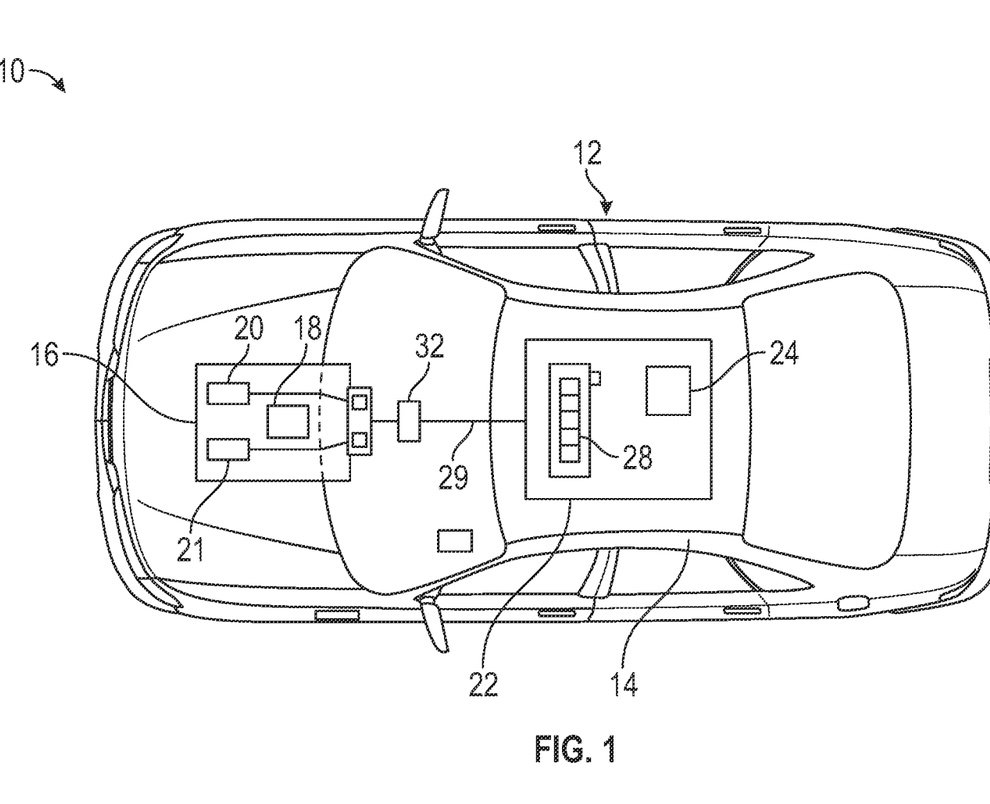
FIG. 1 is a vehicle including a system for individualized power consumption profile generation.

The vehicle 10 may be a combustion engine vehicle, an electrically powered vehicle (EV) or a hybrid vehicle. In an embodiment, the vehicle 10 is a hybrid vehicle that includes a combustion engine system 18 and at least one electric motor assembly. For example, the propulsion system 16 includes a first electric motor 20 and a second electric motor 21. The motors 20 and 21 may be configured to drive wheels on opposing sides of the vehicle 10. Any number of motors positioned at various additional locations about the vehicle 10 may be used to provide power to corresponding systems and subsystems.

The battery system 22 may be electrically connected to the motors 20 and 21 and/or other components, such as vehicle electronics. The battery system 22 may be configured as a rechargeable energy storage system (RESS) and includes multiple power cells partitioned into portions. The battery system controller 24 is included within the battery system 22 and controls the charging and discharging functions of the batteries within the battery system 22. In alternative configurations, the battery system controller 24 can be a general vehicle controller remote from the battery system 22 and configured to control multiple systems and/or subsystems. The general vehicle controller can be located at any position within the vehicle 10. In yet further alternatives, the battery system controller 24 can be a distributed control system including multiple coordinating controllers throughout the vehicle 10 encompassing controllers within the battery system 22 and controllers remote from the battery system 22.

In one embodiment, the battery system 22 includes multiple battery packs 28. The battery packs 28 include multiple distinct battery power cells (cells) arranged in parallel and connected to a power distribution bus 29 for providing power to one or more systems. In the exemplary system of FIG. 1, the power distribution bus 29 is illustrated in simplified form as a single line and provides power to the propulsion systems 16 through an inverter 32.

Figure 2:
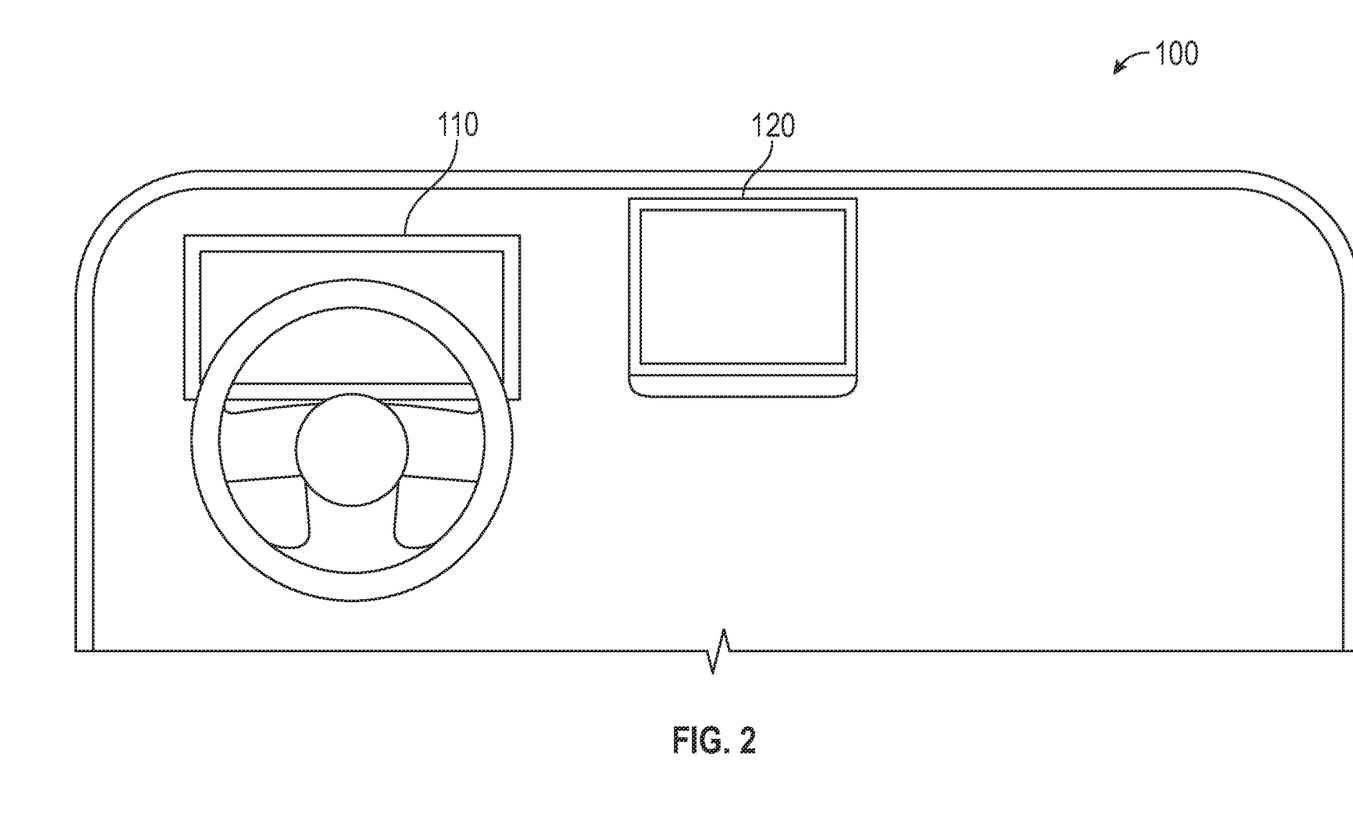
FIG. 2 is a dashboard view of the vehicle of FIG. 1.

With continued reference to FIG. 1, FIG. 2 schematically illustrates an exemplary dashboard 100 of the vehicle 10. Among other elements, the dashboard 100 includes an instrument cluster 110 and an infotainment screen 120. In alternative examples, the infotainment screen 120 can be replaced via a mobile device and/or another removeable screen able to interface with the vehicle 10, with the mobile device being able to communicate with the vehicle 10 and operate as an infotainment screen 120. In yet other examples, a mobile device and/or removeable screen can be included in addition to the infotainment screen 120. Further, while illustrated in FIG. 2 as a digital screen for displaying vehicle instrumentation, it is appreciated that the instrument cluster 110 could be a traditional instrument cluster including analog gauges, or a combination of analogue and digital gauges.

The infotainment screen 120 is in communication with one or more vehicle controllers, including the battery system controller 24. In some examples, the infotainment screen 120 is further in communication with a remote backend software system, such as a fleet management software suite. The communication can be direct communication, or indirect through a vehicle communication hub, such as a CAN bus. One or more of the controllers and remote backend software systems connected to the infotainment screen 120 stores a method for developing vehicle and/or fleet specific power consumption profiles that may be offered to a vehicle operator in order to minimize range anxiety and allow the vehicle operator to optimize their driving experience. The methods for fleet specific power consumption profile generation are functionally the same as the described vehicle specific power consumption profile generation, with the power consumption profiles being developed based on fleet-wide data, rather than individual vehicle data.

Each vehicle 10 includes a set of preinstalled power configurations that may be specific to the model of vehicle, but will not account for specific usage patterns, and specific quirks of the vehicle that may arise due to manufacturing variance and usage based variation. By way of example, stock power configuration profiles suitable for a vehicle driven in an arid desert with minimal precipitation may not be as suitable for a vehicle driven in a wet hilly environment. Thus, it is beneficial to generate vehicle or fleet specific power configuration profiles.

Figure 3:
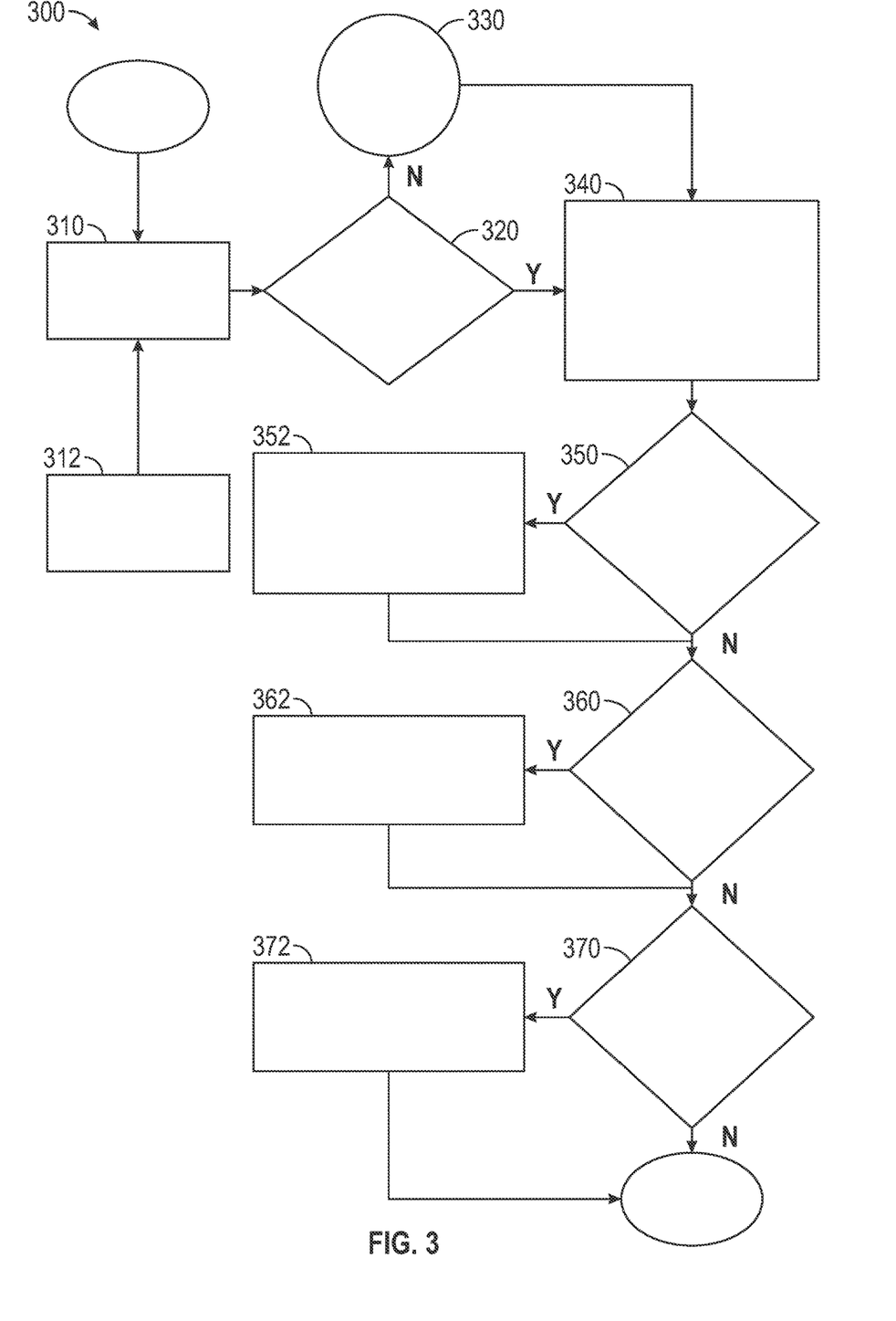
FIG. 3 is a control flow for implementing an individualized power consumption profile for an electric vehicle.

With continued reference to FIGS. 1 and 2, FIG. 3 illustrates a method 300 for implementing one or more specific power consumption profiles for a given vehicle or fleet. The method 300 is operated each time the vehicle 10 is operated. During initial operations (e.g. the first 50 hours of vehicle operation, first ten vehicle trips, or any similar restriction), the method 300 performs only an initial data collection step 310. The data collection step 310 identifies vehicle specific operation data elements 312, including planned vehicle routes, current weather conditions, a number of vehicle passengers, a time of day, a location within the vehicle of each passenger, a total payload weight of the vehicle, a current traffic condition (e.g., heavy traffic, light traffic, construction traffic, etc.), and whether the vehicle 10 is being used in a ride sharing capacity. In some examples, additional data elements 312 that are available may be collected. In a single vehicle example, the data elements are sourced from one or more memories and controllers within the vehicle 10. In a fleet example, the data elements 312 are sourced from memories and controllers within the vehicle and/or via a connection to a remote software backend with the remote software backend including compilations of data elements 312 from vehicles across the fleet.

After the vehicle has met the initial restriction, each time the vehicle is operated the method 300 performs the data collection step 310 and proceeds to an available configurations check 320, where the method 300 checks to determine if any currently stored available power configurations match the current conditions identified within the data elements 312.

When there are no suitable power configurations at the available configurations check 320, the method 300 initiates a power consumption configuration creation method 330 as a sub-method. The method 300 uses available data elements 312, and historical vehicle or fleet specific data to generate one or more new power consumption configurations that can be suggested to the user. The power consumption configuration creation method 330 is described in further detail with regard to FIG. 4.

If any of the stock power consumption configurations are suitable, or if any previously generated vehicle or fleet specific power consumption configurations are suitable, the method 300 selects the most suitable power consumption configuration based on the data elements 312. After selecting the most suitable power consumption configuration profile, the method 300 suggests feature disable and enable options identified within the suitable power consumption profile(s) to the vehicle operator via a prompt on the infotainment screen 120 in a power configuration suggestions step 340. The suggestions include features that are impacted by operator preference, and/or may have a significant impact on the trip quality without including every feature that can have an impact on power consumption. The suggestions further allow the vehicle operator to tailor the power consumption of the vehicle to the current specific usage beyond the tailoring provided by the power consumption profile.

During the power configurations step 340, the controller implementing the method 300 analyzes available system data including HVAC conditions (e.g. is the air conditioning system on, and at what temperature), exterior vehicle temperature/ambient temperature, current location of passengers within the vehicle, a currently planned route provided to a navigation app operating on the infotainment screen 120, and current traffic along the route and determines one or more power consumption suggestions to present to the operator. The suggestions modify the power consumption profile to account for conditions specific to the trip without providing the operator with an overwhelming number of insignificant choices.

The suggestions can be presented via the infotainment screen 120, and include options such as: Disabling passenger screens positioned at seats with no passengers; Disabling long distance vehicle features for a trip with an expected short distance; and Enabling or disabling features related to the traffic conditions. The list of feature suggestions is exemplary in nature and is not exhaustive. It is appreciated that any number of additional suggestions may be implemented or included as identified.

Each of the suggestions includes an option for the vehicle operator to accept or decline the suggestion, along with an indicator that accepting the suggestion will either increase or decrease the range of the vehicle. In some examples, the controller implementing the method 300 can cause the indicator to be an approximate range increase (or decrease) associated with the suggestions. By way of example, the suggestion may be accompanied by a prompt indicating "Accepting this suggestion will increase your vehicle range on the current charge by approximately 4 miles." Alternatively, nonverbal indicators such as a green up arrow for increased range and a red down arrow for decreased range may be utilized to similar effect.

After prompting the vehicle operator with the one or more suggestions, the method 300 determines which suggestions have been accepted by the user at a suggestion acceptance check 350. Any accepted suggestions are enacted in a disable/enable features step 352, and the vehicle operator's preferences are stored in a memory for reference in future iterations of the method 300, or of the power consumption configuration creation method 330.

After any feature suggestions have been enacted, the method 300 verifies that the user wishes to enact the full power consumption configuration, including the accepted suggestions in a power configuration acceptance check 360. If the user accepts, the power configuration is enacted by the controller(s) in an enable power consumption configuration step 362. If the user does not accept, a default, or stock, power configuration is utilized. In either case, the method 300 advances to an intelligent infotainment check 370.

During the intelligent infotainment check, 370 the method 300 requests that the vehicle operator enable an intelligent infotainment feature. When the user accepts, the method 300 enables intelligent infotainment systems in an enable intelligent infotainment step 372. Enabling the intelligent infotainment systems allows for the infotainment screen 120 or a controller running the infotainment screen 120 to actively monitor the trip and make certain automatic adjustments to the power usage of the infotainment system as the vehicle is being driven, rather than locking in a fully predetermined power consumption profile at the start of the vehicle operation.

In some examples, the adjustments made by the intelligent infotainment system can include turning a navigation screen on or off based on real time information from a navigation system. The real time information can include identifying that the vehicle is within a threshold distance of a destination or a threshold period of time elapsing since a destination has been reached. In addition, the infotainment system can turn on, or adjust brightness, based on a media change (e.g. radio station change disc track change, etc.) or based on an incoming critical alert (emergency broadcast, vehicle systems alerts, etc.). In addition, the intelligent infotainment system can include a wake-up command triggered on any number of predetermined criteria, allowing the intelligent infotainment system to leave the infotainment screen 120 off for a majority of a trip.

At each iteration of the method 300, available data regarding who the driver was, what selections the driver made, and the various conditions and factors of the drive is stored in a database, allowing future iterations of the method 300 to be more tailored to a given user, thereby improving the configurability without providing the user an overwhelming number of options.

With continued reference to FIGS. 1-3, FIG. 4 illustrates the power consumption configuration creation method 330 utilized as a sub-method of FIG. 3. At the start of the power consumption configuration creation method 330, the system identifies the data elements 312 in a data collection step 410. Once collected, the data collection step 410 identifies a number of pertinent features from the full list of configurable features and presents the features to a user in a select features to disable step 420. The features are presented to the user in a list form and can include features 422 such as climate controls, seat warmers, infotainment screens 120, lighting, wifi/hotspot/Bluetooth, wireless charging, radio tuner, and auxiliary ports among other possible features.

Figure 4:
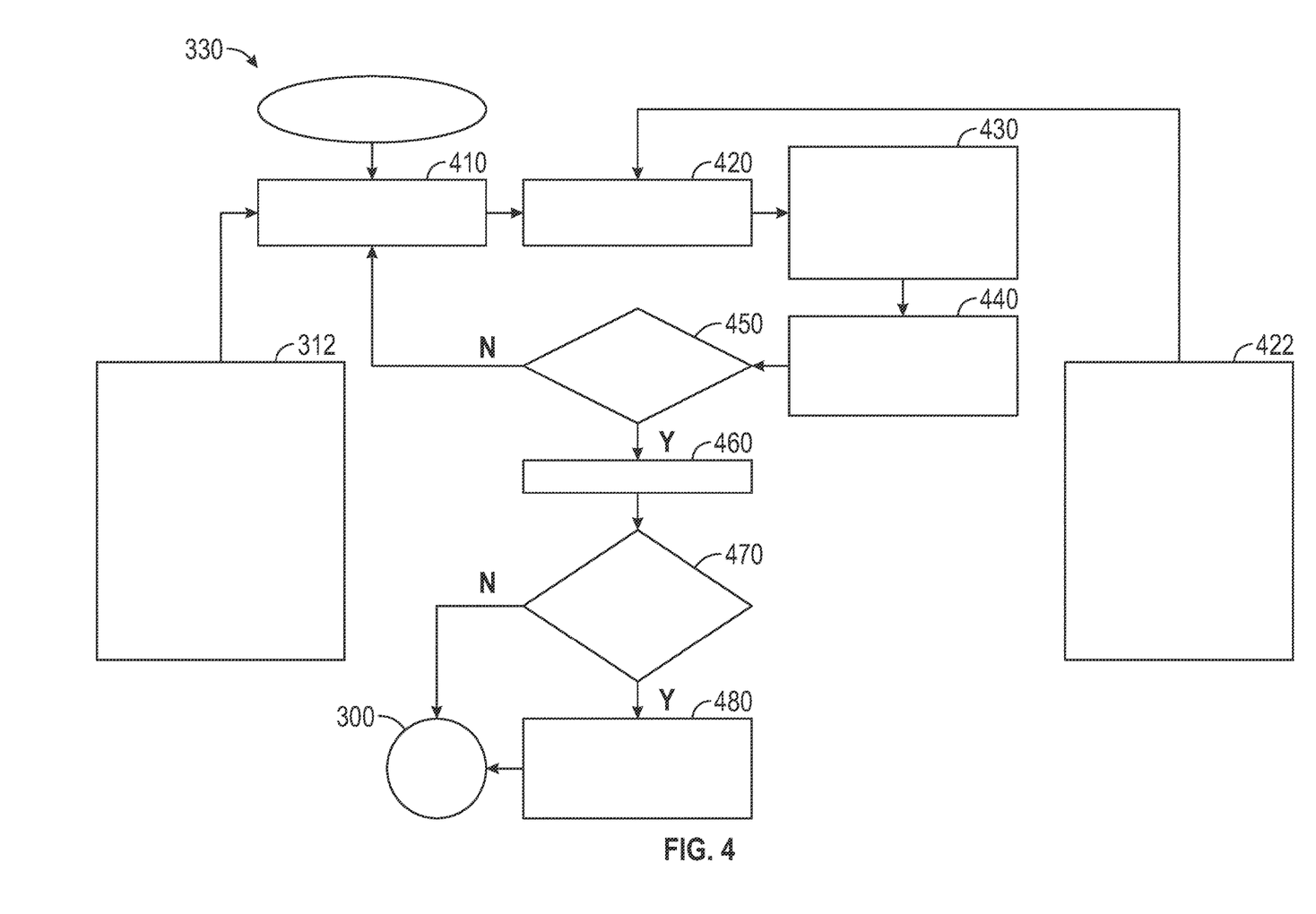
FIG. 4. is a control flow for continuously generating vehicle specific power consumption profiles.

During the step 420, the set of features presented to the user for selection is more robust and comprehensive than the features identified in the power consumption configuration suggestions step 340 of the method 300. The more comprehensive list of features allows for the creation of a baseline set of enabled and disabled features for the power consumption configuration, while the power consumption configuration suggestions step 340 of the method 300 provides the user with the option to modify a smaller number of features from a baseline power setting dependent on specific conditions of a trip.

After the user has selected a feature to disable, the method 330 computes an estimated energy savings and mileage added in a compute energy savings step 430.

The computed energy savings are presented to the user via the infotainment screen 120 in a notify user of impact step 440 and the user is able to confirm the decision in a confirm disable check 450. In the example of FIG. 4 the user confirms all the feature selections as a batch in a single confirmation step. In alternative implementations, the features 422 can be individually selected and confirmed with minimum modification to the power consumption configuration creation method 330.

When the user does not confirm the selection in the confirm disable check 450, the power consumption configuration creation method 330 returns to the data collections step 410 and reiterates.

When the user does confirm the selection in the confirm disable check 450, the selected features are disabled in a disable features step 460.

After selecting and disabling the features, the power consumption configuration creation method 330 prompts the user as to whether the user wishes to save the current configuration in a save configuration check 470. If the user wishes to save the configuration, the power consumption configuration creation method 330 creates an identifier for the configuration and saves it in the set of configurations in a save configuration step 480, after which the power consumption configuration creation method 330 returns to the primary method 300 (illustrated in FIG. 3).

Alternatively, when the user does not wish to save the profile, and instead wishes to use it for a single trip, the save configuration step 480 is bypassed and the power consumption configuration creation method 330 proceeds directly back to the primary method 300.

The system described herein enables customers to customize their vehicle's energy consumption by automatically adjusting a base consumption profile and allowing a user to choose which features to deactivate, from a select list of impactful features. The system allows drivers to create personalized power modes with specific features activated or deactivated according to their preferences/energy needs. Such features could include: climate controls, seat warmers, infotainment screens, unnecessary lighting, connectivity (wifi hotspot/BT, USB, Wireless charge module), Autonomous driving modes like SuperCruise or ACC (non-safety like AEB), Shut down tuner module (AM/FM/SXM), Auxiliary ports, chargers. While the customer is configuring which features to disable, the system provides dynamic information on potential energy savings and the additional mileage that can be added to the vehicle's range.

Having different power modes allows the customer to dynamically change their power consumption for their current needs. One particular energy saving technique allows for the customer to put the infotainment system into power saving mode. This mode turns off non critical infotainment screens and turns them on before vehicle events such as turns (allowing for the customer to see route guidance when needed), freeway exits or entrances, and the like.

The system can also provide feature disable suggestions based on the following data elements: weather, road congestions, route, time of day/lighting needed, location of occupants in the vehicle (if no occupants in the back, turn off infotainment for those areas), weight of payload.

The system is further beneficial within the realm of ride share jobs, as knowing the details of pickup and drop-off locations and passenger information can be used to predict positive or negative range impacts by added or offloaded weight (historical data from previous rides, details of scheduled events and cargo, etc.). The details of a particular ride sharing trip can be included within the data elements 312. Additionally, the system could optimize dynamic "transfers" to other rideshares to extend range when charging is getting low. The system would alert passengers of the tradeoff benefits of avoiding a stop to charge vs. changing vehicles.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method for implementing custom power consumption profiles for electric vehicles comprising:
   identifying a set of data elements corresponding to a specific upcoming trip using a controller, wherein the set of data elements includes whether a planned vehicle route is a ride sharing route, ride sharing trip information of the planned vehicle route, a number of vehicle passengers, a location of vehicle passengers in a vehicle, and weight of a payload;
   identifying whether an existing custom power consumption profile matching the set of data elements is available to the controller and responding to a lack of existing custom power consumption profiles by entering a create custom power consumption profile routine;
   responding to identification of an existing custom power consumption profile by providing a vehicle operator with at least one suggested modification to the existing custom power consumption profile; and
   enacting the identified custom power consumption profile including all accepted suggested modifications of the at least one suggested modification.

2. The method of claim 1, wherein each suggested modification in the at least one suggested modification is displayed to a vehicle operator using an infotainment screen.

3. The method of claim 2, wherein each suggested modification includes an expected range increase corresponding to acceptance of the suggested modification.

4. The method of claim 1, further comprising a prompt requesting a vehicle operator to confirm acceptance of the at least one suggested modification and a prompt requesting the vehicle operator to confirm implementation of a modified power consumption profile after the vehicle operator has responded to all of the at least one suggested modifications.

5. The method of claim 1, further comprising prompting the vehicle operator with an option to enable an intelligent infotainment system and enabling the intelligent infotainment system in response to the vehicle operator accepting the prompt.

6. The method of claim 5, wherein the intelligent infotainment system includes one of disabling a display and dimming the display and one of enabling the display and brightening the display in response to a triggering event.

7. The method of claim 1, wherein the create custom power consumption profile routine comprises:
   retrieving the set of data elements;
   providing a list of features to the vehicle operator and receiving a set of features to disable from the vehicle operator;
   prompting the vehicle operator to confirm disabling the features in the set of features to disable; and
   saving the set of features to disable as a feature adjustment and outputting the feature adjustment as a new power consumption profile.

8. The method of claim 7, further comprising saving the new power consumption profile to a memory.

9. The method of claim 1, wherein the at least one suggested modification to the existing custom power consumption profile includes at least one suggested transfer of passengers from the vehicle to another rideshare vehicle.

10. A vehicle comprising:
    an energy storage system and a controller, the controller including a memory storing instructions for causing the controller to perform a method of:
    identifying a set of data elements corresponding to a specific upcoming trip using a controller, wherein the set of data elements includes whether a planned vehicle route is a ride sharing route, ride sharing trip information of the planned vehicle route, a number of vehicle passengers, a location of vehicle passengers in a vehicle, and weight of a payload;

identifying whether an existing custom power consumption profile matching the set of data elements is available to the controller and responding to a lack of existing custom power consumption profiles by entering a create custom power consumption profile routine;

responding to identification of an existing custom power consumption profile by providing a vehicle operator with at least one suggested modification to the existing custom power consumption profile; and enacting the identified custom power consumption profile including all accepted suggested modifications of the at least one suggested modification.

11. The vehicle of claim 10, wherein each suggested modification in the at least one suggested modification is displayed to a vehicle operator using an infotainment screen.

12. The vehicle of claim 11, wherein each suggested modification includes an expected range increase corresponding to acceptance of the suggested modification.

13. The vehicle of claim 10, further comprising a prompt requesting a vehicle operator to confirm acceptance of the at least one suggested modification and a prompt requesting the vehicle operator to confirm implementation of a modified power consumption profile after the vehicle operator has responded to all of the at least one suggested modification.

14. The vehicle of claim 13, further comprising prompting the vehicle operator with an option to enable an intelligent infotainment system and enabling the intelligent infotainment system in response to the vehicle operator accepting the prompt.

15. The vehicle of claim 10, wherein the create custom power consumption profile routine comprises:
retrieving the set of data elements;
providing a list of features to the vehicle operator and receiving a set of features to disable from the vehicle operator;
prompting the vehicle operator to confirm disabling the features in the set of features to disable; and
saving the set of features to disable as a feature adjustment and outputting the feature adjustment as a new power consumption profile.

16. The vehicle of claim 15, further comprising saving the new power consumption profile to a memory.

17. A vehicle controller comprising:
a processer and a memory, the memory storing instructions for causing the vehicle controller to perform a method of:
identifying a set of data elements corresponding to a specific upcoming trip using a controller, wherein the set of data elements includes whether a planned vehicle route is a ride sharing route, ride sharing trip information of the planned vehicle route, a number of vehicle passengers, a location of vehicle passengers in a vehicle, and weight of a payload;
identifying whether an existing custom power consumption profile matching the set of data elements is available to the controller and responding to a lack of existing custom power consumption profiles by entering a create custom power consumption profile routine;
responding to identification of an existing custom power consumption profile by providing a vehicle operator with at least one suggested modification to the existing custom power consumption profile; and
enacting the identified custom power consumption profile including all accepted suggested modifications of the at least one suggested modification.

18. The vehicle controller of claim 17, wherein the method further includes a prompt requesting a vehicle operator to confirm acceptance of the at least one suggested modification and a prompt requesting the vehicle operator to confirm implementation of a modified power consumption profile after the vehicle operator has responded to all of the at least one suggested modification.

19. The vehicle controller of claim 17, wherein the method further includes prompting the vehicle operator with an option to enable an intelligent infotainment system and enabling the intelligent infotainment system in response to the vehicle operator accepting the prompt.

20. The vehicle controller of claim 17, wherein the create custom power consumption profile routine comprises:
retrieving the set of data elements;
providing a list of features to the vehicle operator and receiving a set of features to disable from the vehicle operator;
prompting the vehicle operator to confirm disabling the features in the set of features to disable; and
saving the set of features to disable as a feature adjustment and outputting the feature adjustment as a new power consumption profile.

* * * * *